US 9,894,153 B2

(12) United States Patent
Leitch (10) Patent No.: US 9,894,153 B2
(45) Date of Patent: Feb. 13, 2018

(54) METHODS AND SYSTEMS FOR PEER-TO-PEER DISCOVERY AND CONNECTION FROM A COLLABORATIVE APPLICATION SESSION

(71) Applicant: Calgary Scientific Inc., Calgary (CA)

(72) Inventor: Sam Anthony Leitch, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 0 days.

(21) Appl. No.: 14/089,095

(22) Filed: Nov. 25, 2013

(65) Prior Publication Data

US 2014/0149512 A1 May 29, 2014

Related U.S. Application Data

(60) Provisional application No. 61/729,481, filed on Nov. 23, 2012.

(51) Int. Cl.
*G06F 15/16* (2006.01)
*H04L 29/08* (2006.01)

(52) U.S. Cl.
CPC ...... *H04L 67/1061* (2013.01); *H04L 67/1068* (2013.01); *H04L 67/1091* (2013.01); *H04L 67/141* (2013.01)

(58) Field of Classification Search
CPC .................................................. H04L 67/1061
USPC ....................................................... 709/204
See application file for complete search history.

(56) References Cited

U.S. PATENT DOCUMENTS

| 6,167,432 A | 12/2000 | Jiang |
| 7,552,175 B2 | 6/2009 | Luo et al. |
| 7,675,874 B2 | 3/2010 | Jennings, III et al. |
| 7,895,338 B2 * | 2/2011 | Leaute ............... H04L 29/06 709/227 |
| 2004/0148348 A1 | 7/2004 | Holt et al. |

(Continued)

FOREIGN PATENT DOCUMENTS

| CN | 1761960 | 4/2006 |
| CN | 1925444 | 3/2007 |

(Continued)

OTHER PUBLICATIONS

International Search Report and Written Opinion, dated Jul. 3, 2014, received in connection with International Application No. PCT/IB2013/003134.

(Continued)

*Primary Examiner* — Glenford Madamba
(74) *Attorney, Agent, or Firm* — Meunier Carlin & Curfman LLC (57) ABSTRACT

Methods and systems are provided herein for initiating real-time, peer-to-peer communication from a collaborative session. Real-time, peer-to-peer communication includes sharing content such as media content over a peer-to-peer connection such as peer-to-peer conferencing, for example. More particularly, from within the collaborative session where a plurality of clients collaboratively interact with a remotely-accessed application, for example, the systems and methods enable discovery of the clients actively participating in the collaborative session (e.g., peer nodes) and enable establishment of peer-to-peer connection(s) between pairs of the clients.

24 Claims, 8 Drawing Sheets

(56) References Cited

U.S. PATENT DOCUMENTS

| | | | |
|---|---|---|---|
| 2005/0243746 A1* | 11/2005 | Mutikainen | H04L 67/14 370/282 |
| 2007/0274233 A1 | 11/2007 | Ptashek et al. | |
| 2009/0013081 A1 | 1/2009 | Laroia et al. | |
| 2009/0177772 A1* | 7/2009 | Guan | H04L 61/1582 709/224 |
| 2010/0235523 A1* | 9/2010 | Garcia | H04L 12/1822 709/228 |
| 2011/0252144 A1 | 10/2011 | Tung et al. | |
| 2012/0195296 A1 | 8/2012 | Adachi et al. | |
| 2013/0290408 A1 | 10/2013 | Stephure et al. | |
| 2014/0032771 A1* | 1/2014 | Pegg | H04L 12/1827 709/228 |
| 2014/0053085 A1 | 2/2014 | Stephure et al. | |
| 2016/0087933 A1* | 3/2016 | Johnson | H04W 4/001 709/245 |

FOREIGN PATENT DOCUMENTS

| | | |
|---|---|---|
| CN | 101690283 | 3/2010 |
| CN | 102215121 | 10/2011 |
| CN | 102624414 | 8/2012 |
| JP | 2003-203023 | 7/2003 |

OTHER PUBLICATIONS

WebRTC 1.0: Real-time Communication Between Browsers, W3C Editor's Draft, Apr. 10, 2014, 70 pages.

Office Action, dated Jun. 20, 2017, received in connection with corresponding European Patent Application No. 13856537.9.

Rosenberg, J., "Interactive Connectivity Establishment (ICE): A Protocol for Network Address Translator (NAT) Traversal for Offer/Answer Protocols," Internet Engineering Task Force (IETF), Apr. 2010, 118 pages.

Office Action, dated Nov. 10, 2017, received in connection with corresponding CN Patent Application No. 201380066710.8 (with English-language translation).

Office Action, dated Oct. 16, 2017, received in connection with corresponding JP Patent Application No. 2015543538 (with English-language translation).

* cited by examiner

METHODS AND SYSTEMS FOR PEER-TO-PEER DISCOVERY AND CONNECTION FROM A COLLABORATIVE APPLICATION SESSION

CROSS-REFERENCE TO RELATED APPLICATION

This application claims priority to U.S. Provisional Patent Application No. 61/729,481, filed Nov. 23, 2012, entitled "METHODS AND SYSTEMS FOR PROVIDING COLLABORATION AND PEER-TO-PEER COMMUNICATION USING MANAGED AND UNMANAGED SERVICES," which is incorporated herein by reference in its entirety.

BACKGROUND

Peer-to-peer services may enable real-time, peer-to-peer communication (e.g., peer-to-peer conferencing) between user devices. For example, peer-to-peer services may allow a pair of user devices to establish a peer-to-peer connection, and then, the user devices may share content, e.g., media content such as audio, video, desktop screen scrapes, image libraries, etc., for example, over the peer-to-peer connection. However, peer-to-peer services fail to provide a mechanism for discovering potential peer devices. Further, before establishing the peer-to-peer connection between the pair of user devices, peer-to-peer services fail to provide a mechanism for the pair of user devices to communicate.

SUMMARY

Methods and systems are provided herein for initiating real-time, peer-to-peer communication from a collaborative session. Real-time, peer-to-peer communication includes sharing content, such as media content, over a peer-to-peer connection such as peer-to-peer conferencing, for example. More particularly, from within the collaborative session where a plurality of clients collaboratively interact with a remotely-accessed application, for example, the systems and methods enable discovery of the clients actively participating in the collaborative session (e.g., peer nodes) and enable establishment of peer-to-peer connection(s) between pair(s) of the clients.

An example peer-to-peer discovery and connection establishment framework for use with a peer-to-peer service can include a collaboration service that enables a plurality of client devices to collaboratively interact within an application session. In other words, the client devices can be participants collaboratively interacting within the application session. In addition, the collaboration service can include a collaboration manager configured to pass one or more messages among the client devices to allow at least one of the client devices to discover the client devices that collaboratively interact within the application session. For example, the collaboration manager can allow one of the participants to discover the other participants collaboratively interacting within the application session. The collaboration manager can also be configured to establish a peer-to-peer connection between a pair of the client devices. The messages can be used to establish peer-to-peer connections between respective pairs of the client devices.

An example method of peer-to-peer discovery and connection establishment for use with a peer-to-peer service can include facilitating an application session where a plurality of client devices collaboratively interact within the application session, allowing at least one of the client devices to discover the client devices that collaboratively interact within the application session, and passing one or more messages among the client devices to establish a peer-to-peer connection between a pair of the client devices. The messages can be used to establish peer-to-peer connections between respective pairs of the client devices.

In some implementations, passing one or more messages among the client devices can include receiving a request to initiate a peer-to-peer connection from one of the client devices, and broadcasting the request to the client devices. Alternatively or additionally, passing one or more messages among the client devices can include passing offer and answer messages among the client devices according to an offer-answer protocol.

In addition, the peer-to-peer service enables the pair of client devices to share content such as media content, for example, over the peer-to-peer connection. For example, after the peer-to-peer connection is established (e.g., by passing the messages among the client devices), the peer-to-peer service can be used to share the media content over the peer-to-peer connection. In other words, the peer-to-peer connection and the peer-to-peer service provide the communication channel for sharing the media content. The media content can be audio or video, for example. Additionally, the media content can be shared over the peer-to-peer connection without using resources of the collaboration service (i.e., outside of the application session).

In some implementations, the client devices that collaboratively interact within the application session can be discovered using session information maintained by the collaboration service. Alternatively or additionally, the collaboration service can enable the client devices to collaboratively interact within the application session by maintaining a state of the application session and passing the state of the application session among the client devices. The state of the application session can be maintained in a state model, for example, with information in the state model being used for peer-to-peer discovery and connection.

More particularly, an example method for peer-to-peer discovery and connection establishment for use with a peer-to-peer service can include obtaining a session identifier for each device from a collaboration service, including a local session identifier for a local peer device and a remote session identifier for a remote peer device (e.g., remote to the local peer device) that are active in a collaborative application session. Discovery and connection can include determining whether the local session identifier is less than the remote session identifier, and if the local session identifier is less than the remote session identifier, sending an offer message from the local peer device to the remote peer device. Additionally, the method can include receiving an answer message from the remote peer device at the local peer device, and establishing a peer-to-peer connection between the local and remote peer devices. According to the method, the offer and answer messages can be exchanged using the collaboration service. After the peer-to-peer connection is established (e.g., by passing the messages among the local and remote peer devices), the peer-to-peer service can be used to share media content over the peer-to-peer connection. Additionally, the media content can be shared over the peer-to-peer connection without using resources of the collaboration service (i.e., outside of the application session). In addition, the local and remote peer devices can continue to collaborate around the collaborative application while the media content is shared of the peer-to-peer connection.

Another example method for peer-to-peer discovery and connection establishment for use with a peer-to-peer service can include obtaining a session identifier for each device from a collaboration service, including a local session identifier for a local peer device and a remote session identifier for a remote peer device (e.g., remote to the local peer device) that are active in a collaborative application session. Discovery and connection can include determining whether the local session identifier is greater than the remote session identifier, and if the local session identifier is greater than the remote session identifier, sending an offer message from the local peer device to the remote peer device. Additionally, the method can include receiving an answer message from the remote peer device at the local peer device, and establishing a peer-to-peer connection between the local and remote peer devices. According to the method, the offer and answer messages can be exchanged using the collaboration service. After the peer-to-peer connection is established (e.g., by passing the messages among the local and remote peer devices), the peer-to-peer service can be used to share media content over the peer-to-peer connection. Additionally, the media content can be shared over the peer-to-peer connection without using resources of the collaboration service (i.e., outside of the application session). In addition, the local and remote peer devices can continue to collaborate around the collaborative application while the media content is shared of the peer-to-peer connection.

Yet another example method for peer-to-peer discovery and connection establishment for use with a peer-to-peer service can include obtaining a session identifier for each device from a collaboration service, including a local session identifier for a local peer device and a plurality of remote session identifier for a plurality of remote peer devices (e.g., remote to the local peer device) that are active in a collaborative application session. Discovery and connection can include determining, at the local peer device, which of the remote peer devices to send offer messages to using a function defined by:

$f(a,a)$=false, and $f(a,b)$=true if and only if $a!=b$ AND $f(b,a)$=false, receiving answer messages from the remote peer devices (e.g., the remote peer devices to which the offer messages were sent) at the local peer device, and establishing a peer-to-peer connection between the local and remote peer devices. According to the method, the offer and answer messages can be exchanged using the collaboration service. After the peer-to-peer connection is established (e.g., by passing the messages among the local and remote peer devices), the peer-to-peer service can be used to share media content over the peer-to-peer connection. Additionally, the media content can be shared over the peer-to-peer connection without using resources of the collaboration service (i.e., outside of the application session). In addition, the local and remote peer devices can continue to collaborate around the collaborative application while the media content is shared of the peer-to-peer connection.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for enabling real-time peer-to-peer conferencing around a remotely-accessed application, it will become evident to those skilled in the art that the implementations are not limited thereto, but are applicable for enabling real-time peer-to-peer connections around any type of collaboration session.

Overview

In accordance with aspects of the present disclosure, it is possible to enable discovery of peer devices and establishment of peer-to-peer connections. As described above, peer-to-peer frameworks fail to provide a mechanism for discovery of potential peer devices. Accordingly, discovery of peer devices can be provided by a collaboration service, which enables a plurality of client devices to collaboratively interact, for example, with a remotely-accessed application. As part of its management functionality, the collaboration service can maintain session information, including the identities of the client devices that are active in the collaborative session. The session information can be used to allow a client device to discover the client devices that are also active in the collaborative session. Additionally, the collaboration service can provide for transmission of messages (e.g., messages according to an offer-answer protocol) to/from the client devices that are active in the collaborative session, which enables establishment of peer-to-peer connection(s). Therefore, it is possible to leverage the functionality of the collaboration service in order to enable establishment of peer-to-peer connection(s).

After establishing a peer-to-peer connection, content, such as media content (e.g., audio, video, etc.), for example, can be shared over the peer-to-peer connection. Because the media content is shared over the peer-to-peer connection, the load on the collaboration service is not impacted, e.g., resources used by the collaboration service are not involved in sharing the media content. In other words, as used herein, sharing media content, including audio and/or video, over a peer-to-peer connection (case 1) should be distinguished from sharing media content, including audio and/or video, during a collaboration session (case 2) because a collaboration service is not involved in case 1. It should be understood that sharing media content, in particular audio and/or video shared during a conferencing session, for example, can consume a large amount of resources. This load can therefore be shifted to resources of the client devices instead of the resources of the collaboration service. Further, the media content is securely shared directly between the client devices. Sharing media content over a peer-to-peer connection can add additional security, for example, because it reduces the chance of eavesdropping from a compromised server.

Example Environment

Figure 1:
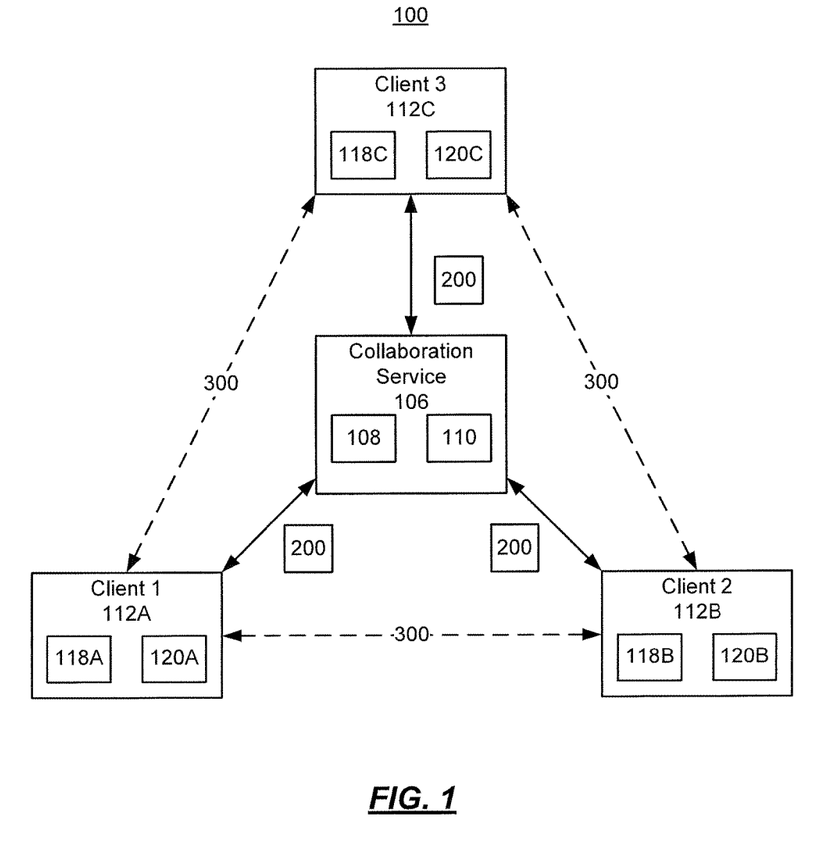
FIG. 1 is a block diagram illustrating an environment for providing peer-to-peer discovery and connection establishment.

Referring now to FIG. 1, a block diagram illustrating an environment 100 for providing peer-to-peer discovery and connection establishment is shown. There are many possible non-limited uses of the environment 100 such as enabling for peer-to-peer discovery and connection establishment. For example, the environment 100 can enable a node participating in a collaborative session (e.g., collaboration around a remotely-accessed application) to discover one or more peer nodes. In addition, the environment 100 can enable establishment of peer-to-peer connections between one or more peer nodes participating in the collaborative session. The environment 100 can include client device 1, 112A (also referred to herein as client computing device 112A), client device 2, 112B (also referred to herein as client computing device 112B) and client device 3, 112C (also referred to herein as client computing device 112C) and a collaboration service 106. The client computing devices 112A, 112B, 112C are also referred to as "peer nodes," "client devices" and/or "user devices" herein. Further, within a peer-to-peer framework each device considers itself local (e.g., local peer) and all other devices as remote (e.g., remote peers). It should be understood that the environment 100 is provided only as an example environment and that the environment 100 can include more or less components than as shown in FIG. 1.

Client computing devices 112A, 112B and 112C can each be any appropriate computing device connected via a communication network to the collaboration service 106. For example, client computing devices 112A, 112B and 112C may each be wireless handheld devices such as, for example, a smart phone such as an IOS-based IPHONE or an ANDROID-based device, a desktop/notebook personal computer or a tablet computer. It is noted that the connections to the communication network may be any type of connection, for example, Wi-Fi (IEEE 802.11x), WiMax (IEEE 802.16), Ethernet, 3G, 4G, etc.

The collaboration service 106 allows collaborative access to a shared resource such as an application or data, for example, via shared state and message passing. The collaboration service 106 can be implemented with one or more computing devices or servers (e.g., the general purpose computing devices described with regard to FIG. 8) and one or more applications. The collaboration service 106 can enable client computing devices 112A, 112B, 112C to participate in a collaborative session. The collaboration service 106 can enable client computing devices 112A, 112B, 112C to collaboratively interact with a remotely-accessed application 108 for example. Although collaboration around a remotely-accessed application is provided as an example, this disclosure contemplates that the collaboration service 106 can enable client computing devices 112A, 112B, 112C to collaboratively interact with other types of remotely-accessed data or services. The collaboration service 106 can enable client computing devices 112A, 112B, 112C to collaboratively interact by updating and/or transmitting a state model 200 between the collaboration service 106 and client computing devices 112A, 112B, 112C. As such, each of the client computing devices 112A, 112B, 112C participating in the collaborative session can present a synchronized view of the remotely-accessed application 108. The state model 200 can include application state information concerning the remotely-accessed application 108 and/or session information concerning the collaborative session. The state model 200 can be represented by, e.g., an Extensible Markup Language (XML) document. It should be understood that other representations of the state model 200 can be used.

Additionally, the collaboration service 106 can include a collaboration manager 110 that can provide capability for passing messages to/from client computing devices 112A, 112B, 112C that are participating in the collaborative session (e.g., collaborating around the remotely-accessed application 108). For example, the collaboration manager 110 can provide a generic message-passing feature ("CollaborationManager") to facilitate passing messages to individual client computing devices (i.e., "CollaborationManager#sendMessage") and/or to facilitate passing messages simultaneously to a plurality of client computing devices (i.e., "CollaborationManager#sendBroadcastMessage"). As described below, the collaboration manager 110 enables peer-to-peer discovery and connection establishment by passing messages between the collaboration service 106 and client computing devices 112A, 112B, 112C.

Client computing devices 112A, 112B, 112C can execute a client application 120A, 120B, 120C, such as a web browser, to enable user interaction for displaying data and/or imagery in a human comprehensible fashion, for example, in a graphical display and for determining user input data in dependence upon received user instructions. Optionally, the graphical display can be a touch-sensitive display (i.e., a touch screen). The client application 120A, 120B, 120C can also cooperate with the collaboration service 106 to enable collaboration among the client computing devices 112A, 112B, 112C. In addition, client computing devices 112A, 112B, 112C can execute a peer-to-peer framework 118A, 118B, 118C. The peer-to-peer framework 118A, 118B, 118C can enable sharing of content, such as media content, for example, over peer-to-peer connections (e.g., peer-to-peer connections 300 in FIG. 1) established between respective pairs of client computing devices 112A, 112B, 112C. This disclosure contemplates that peer-to-peer connections can be established between any pair(s) of client computing devices 112A, 112B, 112C on-the-fly. For example, the peer-to-peer framework 118A, 118B, 118C can include one or more APIs that provide capability for real-time, peer-to-peer communication over the communication network described above. The APIs can enable establishment/creation of peer-to-peer connections (e.g., using an offer-answer protocol), management of peer-to-peer connections and/or management of local resources such as webcams, microphones, etc. After establishing a peer-to-peer connection, media content including, but not limited to, audio, video, text, data, desktop screen scrapes and image libraries, can be shared in real-time over the peer-to-peer connection. For example, the media content can be captured by local media resources such as webcams, microphones, etc. of the client computing devices 112A, 112B, 112C and shared via the peer-to-peer framework 118A, 118B, 118C.

One example peer-to-peer frame work is WEBRTC (available at http://webrtc.org). WEBRTC includes a plurality of JavaScript APIs that integrate with HTML to provide capability for real-time, peer-to-peer communication over a computer network. For example, WEBRTC includes an API ("getUserMedia") that provides access to local media resources, which allows the local media resources to be attached to local elements for display and/or communicated over a peer-to-peer connection. Additionally, WEBRTC includes an API ("PeerConnection") that provides capability for managing a peer-to-peer connection between a pair of the client computing devices. This API provides capability for negotiating sharing of media resources by managing transmission protocols, video/audio codecs, network address translation (NAT) traversal details, etc. This API provides an offer-answer protocol that defines information necessary to create a peer-to-peer connection. Using this API, media resources can be attached to remote elements for display. Further, WEBRTC includes an API that provides a raw data channel for general purpose communications. It should be understood that WEBRTC is only one example framework and that this disclosure contemplates implementations using similar frameworks.

However, peer-to-peer frameworks such as WEBRTC, for example, fail to provide capability for discovering potential peer nodes. In other words, peer-to-peer frameworks do not enable one client computing device to discover (or find, identify, etc.) one or more peer client computing devices in order to establish peer-to-peer connection(s). As discussed in further detail below, this functionality can be provided by a collaboration service (e.g., the collaboration service 106 in FIG. 1). For example, in addition to enabling collaboration around the remotely-accessed application 108, the collaboration service 106 can provide capability for detecting peer nodes and establishing peer-to-peer connections. Using the collaboration manager 110, the collaboration service 106 can pass messages (e.g., connection request messages, offer messages, answer messages, etc.) to client computing devices 112A, 112B, 112C to enable peer-to-peer discovery and establishment of peer-to-peer connections between any pairs of client computing devices 112A, 112B, 112C on-the-fly. Then, the peer-to-peer framework 118A, 118B, 118C can provide capability for sharing media or other content over the peer-to-peer connections. Accordingly, a collaboration server and peer-to-peer framework can work together to enable peer-to-peer communication. Further, while the peer-to-peer discovery and connection establishment processes rely on the collaboration service, once a peer-to-peer connection is established, the collaboration service is not involved in the peer-to-peer communication (e.g., sharing of media content), which reduces the load on the collaboration service.

Example Communication Flows

Figure 2:
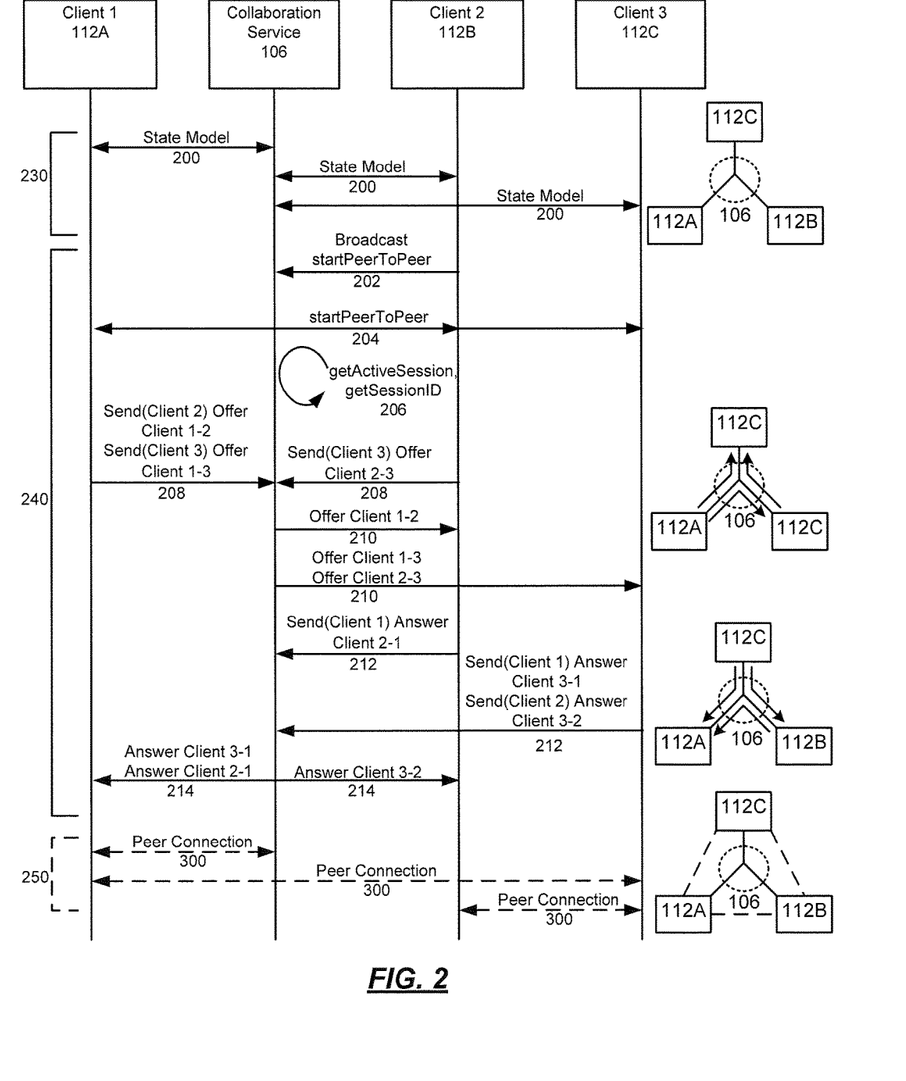
FIG. 2 is a call flow diagram illustrating communication flows within the environment of FIG. 1.

Referring now to FIG. 2, a call flow diagram illustrating communication flows within the environment of FIG. 1 is shown. In particular, the call flow diagram illustrates the establishment of peer-to-peer connections between client computing devices 112A, 112B, 112C, for example. Although FIG. 2 illustrates establishment of peer-to-peer connections between three client devices, it should be understood that the operations can be used for establishing peer-to-peer connects between any number of client devices. The call flow diagram is divided into stages, namely, collaboration 230, peer-to-peer discovery 240 and peer-to-peer communication 250. During the collaboration stage 230, client computing devices 112A, 112B, 112C (e.g., participants) can be collaborating around a remotely-accessed application (e.g., remotely-accessed application 108 of FIG. 1), and the collaboration service 106 is used to communicate the state model 200 among the client computing devices 112A, 112B, 112C.

Figure 3A:
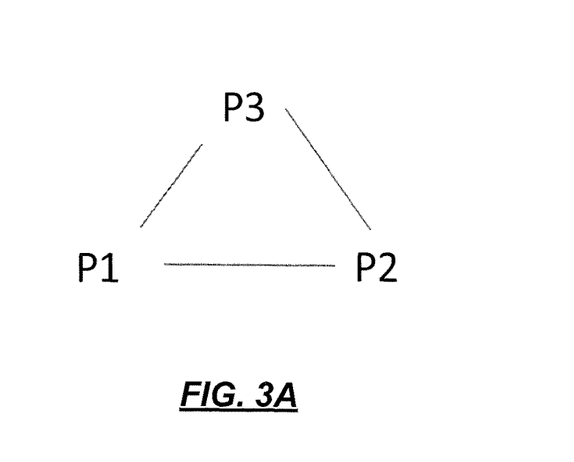
FIGS. 3A-3C illustrate peer-to-peer connections between a plurality of nodes.
Figure 3B:
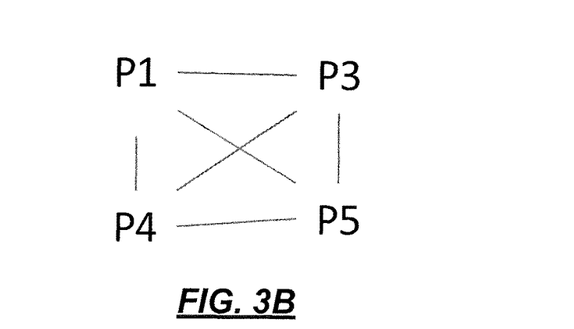
Figure 3C:
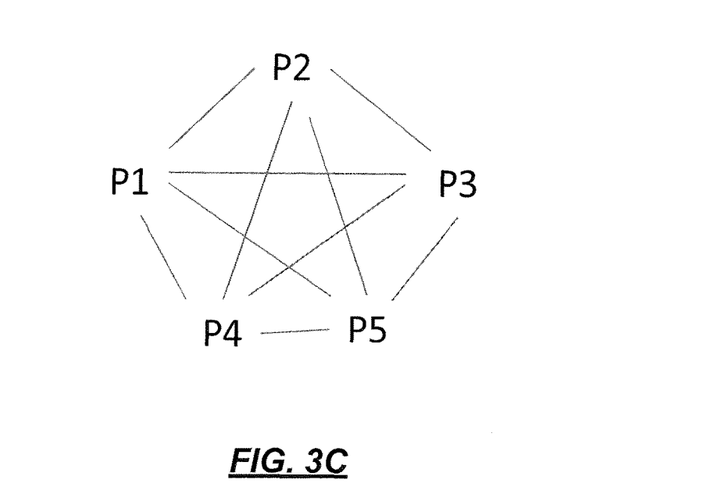

It should be understood that each peer-to-peer connection is between two nodes. Thus, an API such as PeerConnection described above provides for sending one offer and receiving one answer to the offer, or for receiving one offer and sending one answer, at one end of a peer-to-peer connection to establish the peer-to-peer connection. To connect more than two nodes, each of the nodes establishes a peer-to-peer connection (e.g., by exchanging offer-answer messages, for example) with every other node. However, for each pair of nodes, only one of the nodes in the pair is required to send an offer message to be answered by the other one of the nodes in the pair. Referring now to FIGS. 3A-3C, peer-to-peer connections between a plurality of nodes are shown. For example, in FIGS. 3A-3C, three, six and ten connections are required for three, four and five node systems, respectively. It should be understood that the number of connections increases with the number of nodes. It should also be understood that this disclosure contemplates enabling real-time peer-to-peer connections between any number of nodes greater than or equal to two nodes.

Referring again to FIG. 2, in order to establish a peer-to-peer connection and initiate real-time peer-to-peer communication, any one of client computing devices 112A, 112B, 112C can send a message (e.g., "startPeerToPeer") to initiate peer-to-peer communication, regardless of who is hosting the collaboration session. For example, as shown in FIG. 2, client computing device 112B can send a startPeerToPeer message (flow 202). For example, the startPeerToPeer message can be sent using CollaborationManager#sendBroadcastMessage in order ensure that the startPeerToPeer message is sent to all nodes participating in the collaborative session. The startPeerToPeer message can therefore be broadcast to every node that is collaborating around the remotely-accessed application. The startPeerToPeer message can be sent from client computing device 112B to the collaboration service 106, for example. Then, the collaboration service 106 can broadcast the startPeerToPeer message to client computing devices 112A, 112B, 112C (flow 204). Additionally, during the peer-to-peer discovery stage 240, client computing devices 112A, 112B, 112C can continue to collaborate around the remotely-accessed application (e.g., the state model 200 continues to be passed between client computing devices 112A, 112B, 112C and the collaboration service 106). Using the collaboration manager 110, it is possible to identify active sessions and participants (e.g., client computing devices 112A, 112B, 112C).

Upon receiving the startPeerToPeer message, a receiving node (i.e., a local peer device) can access and store its local media resource, for example, using an API such as getUserMedia. The local peer device can identify one or more peer devices from the collaborative session information (i.e., remote peer devices). For example, the local peer device can obtain a list of active session identifiers (e.g., session identifiers associated with remote active peer devices using "CollaborationManager#getActiveSessions") and its own local session identifier (using "CollaborationManager#getSessionId") (flow 206). As described above, the collaborative service 106 can maintain the session information as part of the state information, for example, as part of the state model 200. It is therefore possible to determine the devices (s) that are remotely-accessing an application at a given time using the collaboration manager 110. The local peer device can then compare its session identifier ("localSessionId") to each other active session identifier ("remoteSessionId") obtained. The local peer device can identify active session identifiers greater than its own session identifier ("localSessionId< remoteSessionId"). In this way, the local peer device can identify peer devices to which to send an offer message using minimal effort. In other words, the local peer device can send an offer message to a peer device(s) having a greater session identifier and not send an offer message to a peer device(s) having a lesser session identifier. This prevents sending offer messages from each of a pair of devices to the other device in the pair. For example, in the three node session of FIG. 2, client computing device 112A sends offer messages to client computing devices 112B, 112C, client computing device 112B sends an offer message to client computing device 112C, and client computing device 112C does not send any offer messages. Thus, it is possible to reduce the total number of messages sent when establishing the peer-to-peer connection(s). Additionally, it is possible to limit the number of peer-to-peer connections to one per pair of devices. It should also be understood that the local peer device can alternatively compare its session identifier to each active session identifier obtained ("localSessionId> remoteSessionId") and send offer messages only to peer device(s) having lesser session identifiers to accomplish the same objective. In other words, the local peer device can send an offer message to a peer device(s) having a lesser session identifier and not send an offer message to a peer device(s) having a greater session identifier. Alternatively or additionally, the local peer device can use any function that follows the protocol (1) below to determine which device to send offer messages to.

$$f(a,a)=\text{false}$$

$$f(a,b)=\text{true if and only if } a!=b \text{ AND } f(b,a)=\text{false} \quad (1)$$

Then, for each peer device with a greater session identifier, the local peer device can create a local peer connection object, for example, using an API such as PeerConnection. The local peer device can then attach its local media resource stored as discussed above to the local peer connection object. The local peer device can store the local peer connection object based on a destination session identifier (e.g., a session identifier of the device to which the offer message is to be sent). Thus, each local peer connection object (i.e., 1 per peer-to-peer connection) can be stored and later accessed.

The local peer device can then create an offer message ("createOffer"), for example, using an API such as PeerConnection. The offer message can include one or more attributes associated with the local peer device. The attributes can include any information about the local peer device that is needed to establish the peer-to-peer connection. The local peer device can add its own session identifier to a field of the offer message such as a "from field," which allows the device to which the offer message is sent to identify the source device. The local peer device can then send the offer message to a destination node (i.e., a remote peer device), for example. This can be accomplished using CollaborationManager#sendMessage, for example. For example, in the three node session of FIG. 2, client computing device 112A sends offer messages to client computing devices 112B, 112C (e.g., Send(Client 2) Offer Client 1-2 and Send(Client 3) Offer Client 1-3 in FIG. 2), client computing device 112B sends an offer message to client computing device 112C (e.g., Send(Client 3) Offer Client 2-3 in FIG. 2), and client computing device 112C does not send any offer messages (flow 208). As shown in FIG. 2, the local peer device(s) send offer message(s) to the collaboration service 106, and the collaboration service 106 passes the offer message(s) to the remote peer device(s). For example, the collaboration service 106 passes the offer messages from client computing device 112A to client computing devices 112B, 112C (e.g., Offer Client 1-2 and Offer Client 1-3 in FIG. 2), and the collaboration service 106 passes the offer message from client computing device 112B to client computing device 112C (e.g., Offer Client 2-3 in FIG. 2) (flow 210). Additionally, client computing devices 112A, 112B, 112C can continue to collaborate around the remotely-accessed application (e.g., the state model 200 continues to be passed between client computing devices 112A, 112B, 112C and the collaboration service 106).

Upon receipt of the offer message, the remote peer device can create a remote peer connection object, for example, using an API such as PeerConnection. The remote peer device can attach its local media resource stored as discussed above to the remote peer connection object. The remote peer device can also attach the one or more attributes associated with the local peer device ("setRemoteDescription") to the remote peer connection object. The remote peer device can then create an answer message ("createAnswer"), for example, using an API such as PeerConnection. The answer message can include one or more attributes associated with the remote peer device. The attributes can include any information about the remote peer device that is needed to establish the peer-to-peer connection.

The remote peer device can add its own session identifier to a field of the answer message such as a "from field," which allows the device to which the answer message is sent to identify the source device. The remote peer device can then send the answer message back to the local peer device, for example. This can be accomplished using CollaborationManager#sendMessage, for example. Upon receipt of the answer message, the local peer device can access the local peer connection object, which was stored based on the destination session identifier, and attach the one or more attributes associated with the remote peer device ("setRemoteDescription"). For example, in the three node session of FIG. 2, client computing device 112C sends answer messages to client computing devices 112A, 112B (e.g., Send(Client 1) Answer Client 3-1 and Send(Client 2) Answer Client 3-2 in FIG. 2), and client computing device 112B sends an answer message to client computing device 112A (e.g., Send(Client 1) Answer Client 2-1 in FIG. 2) (flow 212). Further, as shown in FIG. 2, the remote peer device(s) send answer message(s) to the collaboration service 106, and the collaboration service 106 passes the answer message(s) to the local peer device(s). For example, in the three node session of FIG. 2, the collaboration service 106 passes the answer messages from client computing device 112C to client computing devices 112A, 112B (e.g., Answer Client 3-1 and Answer Client 3-2 in FIG. 2), and the collaboration service 106 passes the answer message from client computing device 112B to client computing device 112A (e.g., Answer Client 2-1 in FIG. 2) (flow 214). Additionally, client computing devices 112A, 112B, 112C can continue to collaborate around the remotely-accessed application (e.g., the state model 200 continues to be passed between client computing devices 112A, 112B, 112C and the collaboration service 106).

The peer-to-peer connection between local and remote peer devices is then brought up. As described above, after all of the offer and answer messages have been exchanged, the peer-to-peer framework 118A, 118B, 118C connects the local and remote peer connection objects and each of the devices can be notified that streaming has begun (e.g., by firing an "onaddstream event"). For example, as shown in FIG. 2, respective peer-to-peer connections 300 are brought up between client computing devices 112A and 112B, client computing devices 112A and 112C and client computing devices 112B and 112C. After establishing the peer-to-peer connections 300, media content can be streamed between the client computing devices 112A, 112B, 112C. In addition, the media content can be streamed without management by the collaboration service 106, which reduces the load on the collaboration service 106. For example, during the peer-to-peer communication stage 250, client computing devices 112A, 112B, 112C can continue to collaborate around the remotely-accessed application (e.g., the state model 200 continues to be passed between client computing devices 112A, 112B, 112C and the collaboration service 106). Thus, it is possible discover peer devices (e.g., peer devices participating in a collaborative session) and establish peer-to-peer connections using the collaboration service 106. Additionally, a peer-to-peer framework such as the peer-to-peer framework 118A, 118B, 118C shown in FIG. 1, for example, can be used to share content of the peer-to-peer connections. Further, it is possible to collaborate around a remotely-accessed application, as well as provide peer-to-peer communication capability such as conferencing capability, for example. Once initiated, real-time, peer-to-peer communication does not utilize the resources of the collaboration service 106. Therefore, it is possible to reduce the load on the collaboration service 106 because media content is shared using the peer-to-peer connection(s) instead of using the collaboration service 106. It should be understood that providing real-time, peer-to-peer communication between a plurality of nodes requires a substantial amount of network resources, which can burden the network resources providing the collaboration service.

Additionally, when a new device is added to an existing real-time peer-to-peer session, the new device can send the startPeerToPeer message. As discussed above, the startPeerToPeer message can be broadcast to a plurality of devices. Then, the process discussed above can be executed by each of the receiving devices (i.e., local peer devices). However, a local peer device is not required to send another offer message to a remote peer device with which an active peer-to-peer connection exists. Thus, a local peer device only sends an offer message to a new device.

Additionally, a device that is participating in a conference within a collaborative session can leave the conference. For example, an exiting device can explicitly leave the conference by sending a bye message. The exiting device can optionally include its session identifier as part of the bye message, for example, in a from field. The bye message can be sent using CollaborationManager#sendBroadcastMessage in order to simultaneously send the message to a plurality of devices that are participating in the collaborative session. The bye message can notify the other devices that the exiting device is leaving the conference. For example, the other devices can identify the exiting device using information within the from field of the bye message and then close the corresponding peer-to-peer connection (i.e., the peer-to-peer connection that connects the exiting device and each of the other devices). The exiting device can also close its peer-to-peer connection with each of the other devices. Accordingly, it is possible to provide a complete break of the peer-to-peer connections, and the conference continues for the remaining devices.

In addition, if the browser of an exiting device is closed without the exiting device explicitly leaving the conference, the exiting device does not send a bye message. However, the other devices participating in the conference may notice that the exiting device stopped sharing media content (e.g., audio, video, etc.) and attempt to reconnect and/or close the corresponding peer-to-peer connection. For example, WEBRTC uses a system called Interactive Connectivity Establishment (ICE) to connect peers through a computer network. ICE is configured to notice when a peer-to-peer connection is lost and trigger an attempt to reconnect. For example, a device remaining in the conference (i.e., a peer device to the exiting device) can trigger an onIceCandidate event. WEBRTC listens for the onIceCandidate event and checks a list of active sessions (i.e., using CollaborationManager#getActiveSessions) to see if the remote session still exists. If the remote session does not exist, the device closes the peer-to-peer connection, and the conference continues for the remaining devices.

Figure 4:
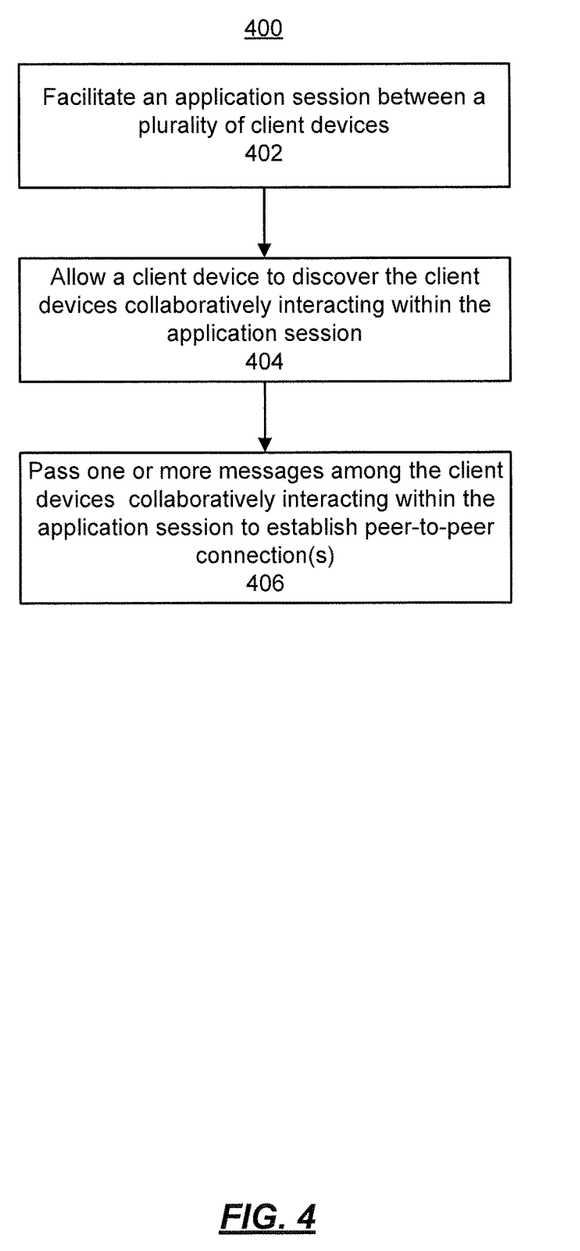
FIG. 4 is a flow diagram illustrating example operations for establishing a peer-to-peer connection around a collaboration session.

Referring now to FIG. 4, a flow diagram illustrating example operations 400 for peer-to-peer discovery and connection establishment is shown. At 402, a collaborative session is facilitated, where a plurality of client computing devices collaboratively interact within the collaborative session, such as an application session. For example, an environment for facilitating a collaborative session for a plurality of client computing devices is described above with regard to FIG. 1. At 404, one of the client computing devices is allowed to discover the client computing devices collaboratively interacting within the collaborative session. For example, a client computing device can discover the client computing devices collaboratively interacting within the collaborative session from session information maintained by a collaboration service such as the collaboration service 106 described with regard to FIGS. 1 and 2. Then, at 406, one or more messages are passed among the client computing devices collaboratively interacting within the collaborative session. For example, a collaboration service such as the collaboration service 106 described with regard to FIGS. 1 and 2 can exchange the messages with the client computing devices. The messages are used for establishing a peer-to-peer connection(s) between a pair(s) of the client computing devices participating in the collaborative session.

Figure 5:
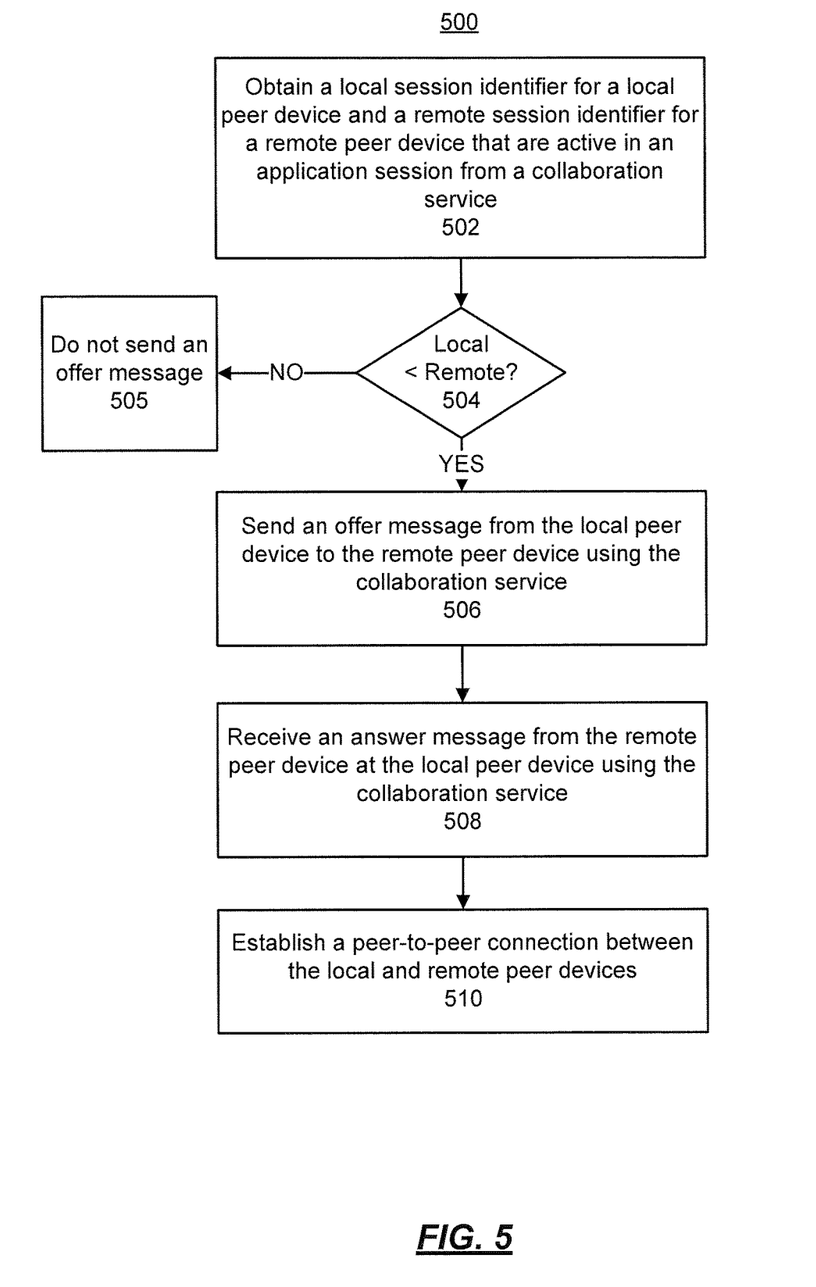
FIG. 5 is another flow diagram illustrating example operations for establishing a peer-to-peer connection around a collaboration session.

Referring now to FIG. 5, a flow diagram illustrating example operations 500 for peer-to-peer discovery and connection establishment is shown. At 502, a local session identifier for a local peer device and a remote session identifier for a remote peer device that are active in a collaborative session are obtained from a collaboration service. For example, the local and remote session identifiers can be obtained using "CollaborationManager#getSessionID" as described above with regard to FIG. 2. At 504, a determination is made as to whether the local session identifier is less than the remote session identifier. For example, as described with regard to FIG. 2, this allows each peer device to determine which of the other peer devices to send offer messages to while minimizing the number of offer messages sent. Then, at 505, if the local session identifier is not less than the remote session identifier, an offer message is not sent from the local peer device to the remote peer device. On the other hand, at 506, if the local session identifier is less than the remote session identifier, an offer message is sent from the local peer device to the remote peer device using the collaboration service. For example, the offer message can be sent using "CollaborationManager#sendMessage" as described above with regard to FIG. 2. At 508, an answer message is received from the remote peer device at the local client peer using the collaboration service. For example, the offer and answer messages can be transmitted using a collaboration service such as the collaboration service 106 described with regard to FIGS. 1 and 2. At 510, a peer-to-peer connection is established between the local and remote client computing devices. As described above, media content can then be shared over the peer-to-peer connection. For example, after establishing the peer-to-peer connection (e.g., peer-to-peer connections 300), media content can be shared using a peer-to-peer framework such as the peer-to-peer framework 118A, 118B, 118C described with regard to FIG. 1.

Figure 6:
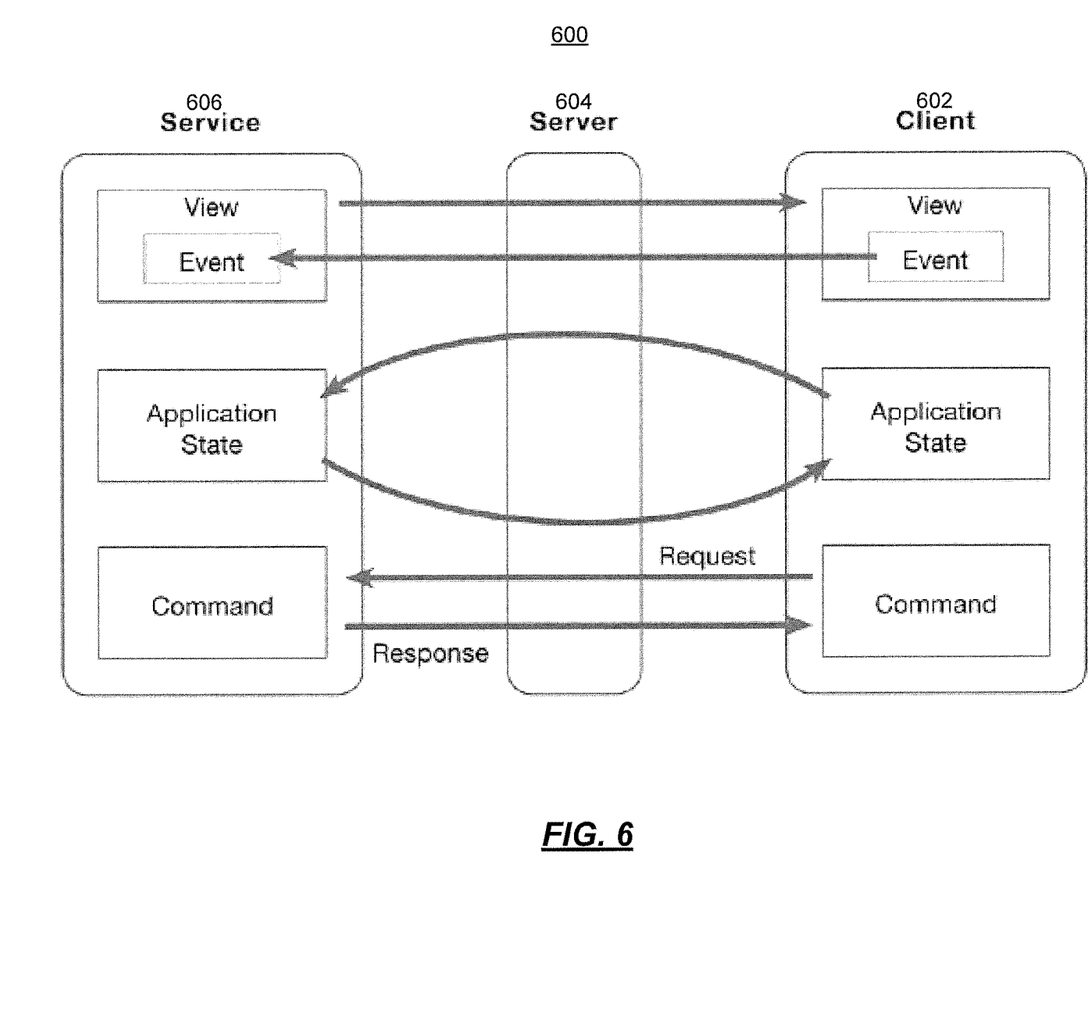
FIG. 6 is a block diagram illustrating a remote access environment.

Referring now to FIG. 6, a block diagram illustrating a remote access environment 600. The remote access environment 600 can enable a collaborative session such as the collaborative session described above, for example. As shown in FIG. 6, the remote access environment 600 includes a client 602 (e.g., client computing device 112A, 112B or 112C of FIG. 1), a server 604 and a service 606 (e.g., the remotely-accessed application 108 of FIG. 1). This disclosure contemplates that a collaboration manager (e.g., the collaboration manager 106B of FIG. 1) can be implemented by any combination of the client 602, the server 604 and the service 606. The remote access environment 600 allows synchronization of views (e.g., display elements) between the client 602 and the service 606. Further, the remote access environment 600 allows synchronization of user inputs between the client 602 and the service 606. For example, the server 604 can manage application state, which can include but is not limited to application and session information, and by managing application state, it is possible to synchronize views and user inputs between the client 602 and the service 606. As described above with regard to FIGS. 1 and 2, the application state can be managed using a state model. The remote access environment 600 can optionally be augmented to enable peer-to-peer discovery and connection establishment. In other words, the server 604, by managing the application state including session information, can allow one (or more) participant(s) to discover the active participants in the collaborative session. Additionally, the server 604 can facilitate transmission of messages for establishing peer-to-peer connection(s) ("commands") between active participants in a collaborative session. Optionally, the remote access environment 600 can be the remote access environment described in U.S. Patent Application Publication No. 2010/0131591, entitled "METHOD AND SYSTEM FOR PROVIDING REMOTE ACCESS TO A STATE OF AN APPLICATION PROGRAM." An example remote access environment is PUREWEB, available from Calgary Scientific, Inc., Calgary, Alberta, Canada.

Figure 7:
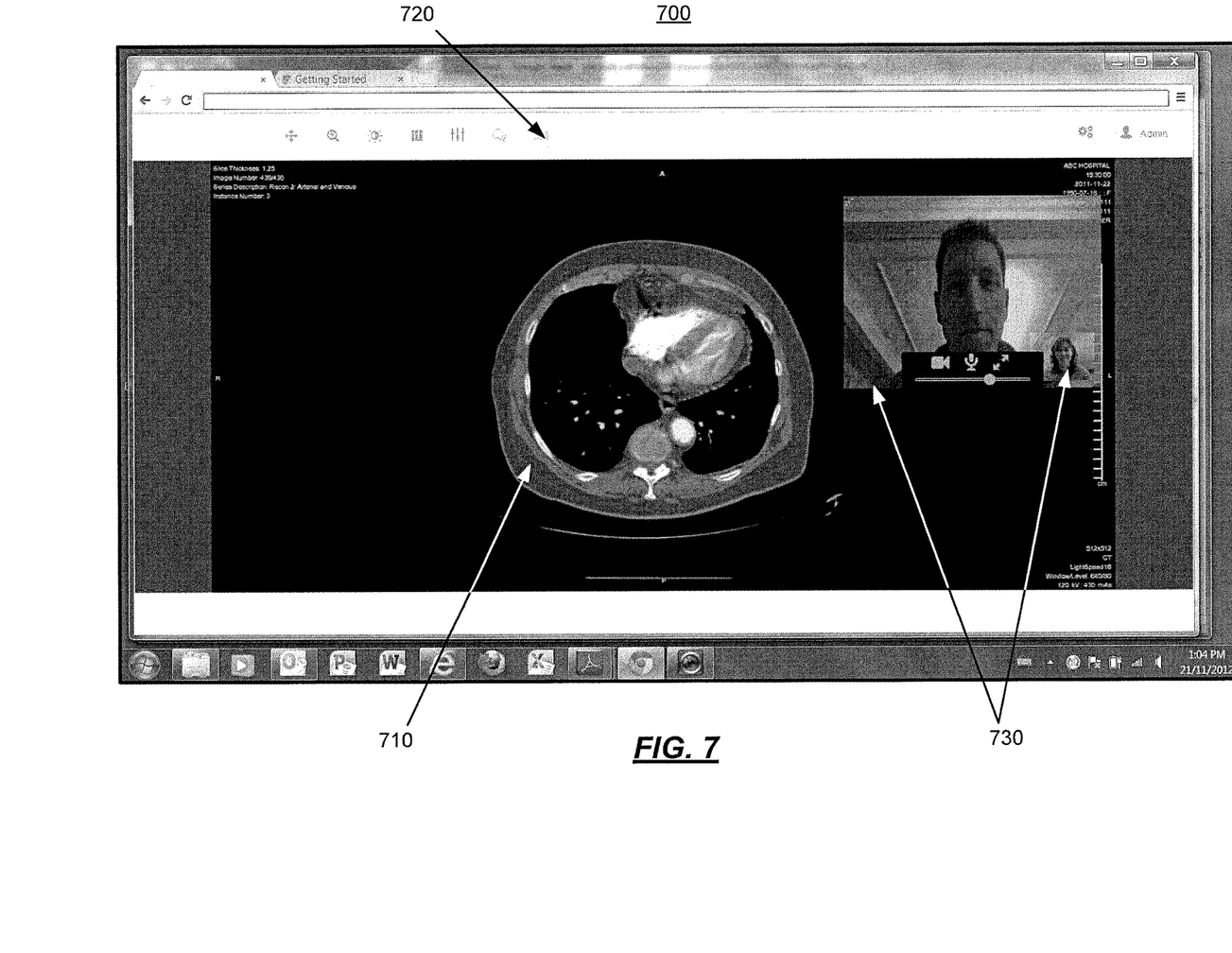
FIG. 7 illustrates an example user interface during a collaborative session with video conferencing.

Referring now to FIG. 7, an example user interface 700 illustrating a collaborative session with video conferencing is shown. Using the systems and methods described herein, it is possible to provide real-time, peer-to-peer communication capability (e.g., conferencing capability) around a collaborative session (e.g., collaboration around a remotely-accessed application). As described above, a collaborative session can involve a plurality of client computing devices remotely-accessing and collaborating around an application such as a medical imaging application. RESOLUTIONMD imaging software as enabled for web or mobile use by the PUREWEB platform, available from Calgary Scientific, Inc., Calgary, Alberta, Canada is an example medical imaging application. Using RESOLUTIONMD, the client computing devices can collaborate and view medical image(s) 710, for example. In addition, using the systems and methods described herein, any one of the client computing devices participating in the collaborative session can initiate real-time, peer-to-peer communication using icon 720, for example. One or more peer client computing devices (e.g., one or more of the client computing devices collaborating around a remotely-accessed application) can be identified based on information collected from the collaborative session information and messages can be passed between a server enabling the collaborative session and the client computing devices to establish peer-to-peer connection(s). Accordingly, it is possible to provide real-time, peer-to-peer communication capability around the collaborative session. As shown in FIG. 7, video 730 (or real-time peer-to-peer communication) can be provided in the user interface 700.

Figure 8:
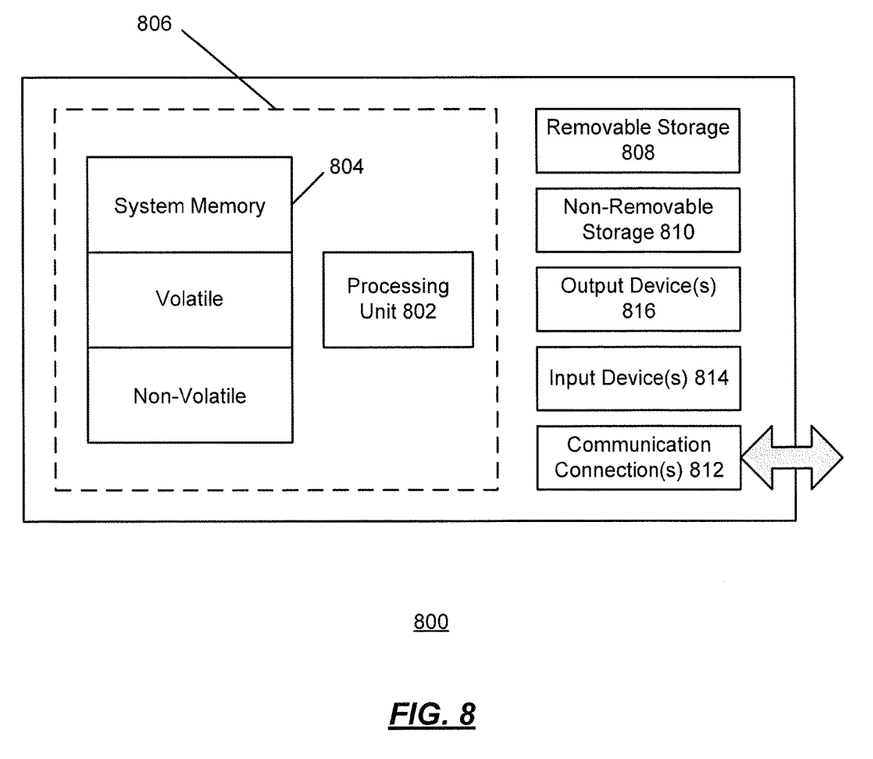
FIG. 8 is a block diagram illustrating an example computing device.

FIG. 8 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communication network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 808.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A peer-to-peer discovery and connection establishment framework for use with a peer-to-peer service, comprising:
    a collaboration service that establishes an application session, wherein a plurality of client devices collaboratively interact within the application session, and wherein the collaboration service includes a collaboration manager that:
    broadcasts a request to initiate a peer-to-peer connection to the client devices;
    passes a plurality of offer and answer messages among the client devices to allow at least one of the client devices to discover the other client devices that collaboratively interact within the application session, wherein the request is broadcast and the offer and answer messages are passed while the client devices actively collaborate within the application session; and
    establishes the peer-to-peer connection between a pair of the client devices,
        wherein the collaboration manager passes the offer and answer messages among the client devices to establish a plurality of peer-to-peer connections, wherein each of the peer-to-peer connections is between a respective pair of the client devices, wherein the peer-to-peer service enables the pair of client devices to share media content over the peer-to-peer connection, and wherein the media content is shared over the peer-to-peer connection without using resources of the collaboration service.

2. The framework of claim 1, wherein the collaboration manager:
    receives the request to initiate the peer-to-peer connection from one of the client devices.

3. The framework of claim 1, wherein passing the offer and answer messages among the client devices further comprises passing the offer and answer messages among the client devices according to an offer-answer protocol.

4. The framework of claim 1, wherein the media content is at least one of audio or video.

5. The framework of claim 1, wherein the client devices that collaboratively interact within the application session are discovered using session information maintained by the collaboration service.

6. The framework of claim 1, wherein the collaboration service enables the client devices to collaboratively interact within the application session by maintaining a state of the application session and passing the state of the application session among the client devices.

7. The framework of claim 6, wherein the state of the application session is maintained in a state model.

8. The framework of claim 7, wherein the client devices that collaboratively interact within the application session are discovered using session information maintained in the state model.

9. A method of peer-to-peer discovery and connection establishment for use with a peer-to-peer service, comprising:
    establishing an application session, wherein a plurality of client devices collaboratively interact within the application session;
    allowing at least one of the client devices to discover the client devices that collaboratively interact within the application session;
    broadcasting a request to initiate a peer-to-peer connection to the client devices;
    passing offer and answer messages among the client devices to establish a plurality of peer-to-peer connections, wherein each of the peer-to-peer connections is between a respective pair of the client devices, wherein the request is broadcast and the offer and answer messages are passed among the client devices while the client devices actively collaborate within the application session;

establishing the peer-to-peer connection between a pair of the client devices; and facilitating sharing of media content between the pair of client devices over the peer-to-peer connection, wherein the media content is shared over the peer-to-peer connection outside of the application session.

10. The method of claim 9, wherein passing the offer and answer messages among the client devices to establish the peer-to-peer connection between a pair of the client devices further comprises:

obtaining a local session identifier for a local peer device that is active in the application session from the collaboration service;

obtaining at least one remote session identifier for at least one remote peer device that is active in the application session from the collaboration service;

determining whether the local session identifier is greater than the remote session identifier;

if the local session identifier is greater than the remote session identifier, sending an offer message from the local peer device to the remote peer device; and receiving an answer message from the remote peer device at the local peer device, wherein the peer-to-peer connection is established between the local and remote peer devices, and wherein the offer and answer messages are passed between the local and remote peer devices using the collaboration service.

11. The method of claim 9, further comprising:

receiving the request to initiate the peer-to-peer connection from one of the client devices.

12. The method of claim 9, wherein passing the offer and answer messages among the client devices further comprises passing the offer and answer messages among the client devices according to an offer-answer protocol.

13. The method of claim 9, wherein the media content is at least one of audio or video.

14. The method of claim 9, further comprising facilitating the application session by maintaining a state of the application session and passing the state of the application session among the client devices.

15. The method of claim 14, wherein the state of the application session is maintained in a state model.

16. The method of claim 15, wherein the client devices that collaboratively interact within the application session are discovered using session information maintained in the state model.

17. The method of claim 9, wherein passing the offer and answer messages among the client devices to establish the peer-to-peer connection between a pair of the client devices further comprises:

obtaining a local session identifier for a local peer device that is active in the application session from the collaboration service;

obtaining at least one remote session identifier for at least one remote peer device that is active in the application session from the collaboration service;

determining whether the local session identifier is less than the remote session identifier;

if the local session identifier is less than the remote session identifier, sending an offer message from the local peer device to the remote peer device; and receiving an answer message from the remote peer device at the local peer device, wherein the peer-to-peer connection is established between the local and remote peer devices, and wherein the offer and answer messages are passed between the local and remote peer devices using the collaboration service.

18. The method of claim 17, further comprising:

obtaining a plurality of remote session identifiers from the collaboration service, each of the remote session identifiers being associated with a respective remote peer device that is active in the application session;

determining whether the local session identifier is less than each of the remote session identifiers.

19. The method of claim 17, wherein if the local session identifier is less than the remote session identifier, the method further comprising:

creating a local peer connection object using the local peer device; and attaching a local media resource of the local peer device to the local peer connection object, wherein the offer message comprises one or more attributes of the local peer device.

20. The method of claim 19, wherein the one or more attributes of the local peer device include the local session identifier.

21. The method of claim 19, further comprising storing the local peer connection object using the local peer device based on the remote session identifier.

22. The method of claim 19, wherein upon receipt of the offer message, the method further comprising:

creating a remote peer connection object using the remote peer device;

attaching a remote media resource of the remote peer device to the remote peer connection object; and attaching the one or more attributes of the local peer device to the remote peer connection object, wherein the answer message comprises one or more attributes of the remote peer device.

23. The method of claim 22, wherein the one or more attributes of the remote peer device include the remote session identifier.

24. The method of claim 23, further comprising attaching the one or more attributes of the remote peer device to the local peer connection object.

* * * * *